United States Patent [19]

Vogels et al.

[11] Patent Number: 5,093,300
[45] Date of Patent: Mar. 3, 1992

[54] METHOD FOR ACTIVATING A CHROMIUM-CONTAINING CATALYST SUPPORTED ON A SILICA-CONTAINING BASE

[75] Inventors: Claude Vogels, Lasne; Luc Lerot, Brussels, both of Belgium

[73] Assignee: Solvay & Cie (Société Anonyme), Brussels, Belgium

[21] Appl. No.: 203,647

[22] Filed: Jun. 3, 1988

Related U.S. Application Data

[63] Continuation of Ser. No. 652,147, Sep. 18, 1984, abandoned, which is a continuation of Ser. No. 481,877, Apr. 4, 1983, abandoned.

[51] Int. Cl.$^5$ ............................ C08F 4/24; C08F 10/02
[52] U.S. Cl. ............................... 502/256; 502/319; 526/106; 526/352
[58] Field of Search ........................................ 502/256

[56] References Cited

U.S. PATENT DOCUMENTS

| | | | |
|---|---|---|---|
| 2,825,721 | 3/1958 | Hogan et al. | 526/106 |
| 2,888,497 | 5/1959 | Pitzer | 526/106 |
| 3,050,514 | 8/1962 | Cawthon et al. | 526/106 |
| 3,281,405 | 10/1966 | Hogan | 526/106 |
| 3,362,946 | 1/1963 | Hogan | 526/106 |
| 3,446,754 | 5/1969 | Solvik et al. | 252/458 |
| 3,637,637 | 1/1972 | Saccardo et al. | 526/106 |
| 3,900,457 | 8/1975 | Witt | 526/106 |
| 4,041,224 | 8/1977 | Hoff et al. | 526/106 |
| 4,147,849 | 4/1979 | Liu et al. | 526/106 |
| 4,151,122 | 4/1979 | McDaniel et al. | 252/458 |
| 4,173,548 | 11/1979 | Pullukat et al. | 526/106 |
| 4,192,775 | 3/1980 | Rekers et al. | 526/106 |
| 4,380,616 | 4/1983 | Vance et al. | 526/106 |
| 4,397,769 | 8/1983 | McDaniel et al. | 502/256 |

FOREIGN PATENT DOCUMENTS 1083178 9/1967 United Kingdom ............... 526/106

*Primary Examiner*—Edward J. Smith
*Attorney, Agent, or Firm*—Spencer & Frank

[57] ABSTRACT

A method for activating supported chromium oxide catalysts in which a chromium-containing catalyst on a silica-containing base is first heated in an oxidizing atmosphere at temperatures up to about 850° C. and then cooled down. During the cooling step of the catalyst, the oxidizing atmosphere is replaced by a non-oxidizing one, leading to an activated catalyst. A process for the polymerization of alpha-olefins, especially ethylene, in which at least one alpha-olefin is contacted, under polymerization conditions, with the catalyst activated by the method described above.

8 Claims, No Drawings

METHOD FOR ACTIVATING A CHROMIUM-CONTAINING CATALYST SUPPORTED ON A SILICA-CONTAINING BASE

This application is a continuation of application Ser. No. 652,147, filed Sept. 18, 1984, which is a continuation of Ser. No. 481,877, filed Apr. 4, 1983, both now abandoned.

BACKGROUND OF THE INVENTION

The invention relates to the activation of chromium-containing supported catalysts. In another of its aspects, the invention relates to the production of polymers of alpha-olefins in the presence of chromium-containing supported catalysts which have been activated.

Chromium-containing supported catalysts useful for the polymerization of alpha-olefins have been disclosed in U.S. Pat. No. 2,825,721 issued to J. P. Hogan and R. L. Banks. As disclosed in this patent, catalysts containing chromium oxide associated with a support like e.g. silica, are usable for the polymerization of alpha-olefins. These catalysts can be activated by calcination in a non reducing atmosphere for a time sufficient to leave at least a portion of the chromium present in the hexavalent state.

Another method of activation of this type of catalyst has been disclosed in U.S. Pat. No. 3,362,946 issued to J. P. Hogan. As disclosed in this patent, it is possible to increase the activity of chromium-containing supported catalysts, after the catalyst has been activated, by treatment thereof with carbon monoxide at temperatures comprised between about 370 and 540° C.

However, activation treatments of chromium-containing supported catalysts implying the use of carbon monoxide are of course cumbersome.

Further, a decrease of the bulk densities and of the melt indexes of the polyolefins manufactured in the presence of catalysts activated in this way is frequently observed. Finally, the catalysts activated in this way are extremely sensitive to reoxidation.

SUMMARY OF THE INVENTION

It is an object of the present invention to provide an activated chromium-containing catalyst of increased activity. It is a further object of the present invention to provide an improved method of activating chromium-containing supported catalysts. It is yet a further object of the present invention to provide a polymerization process, able to render alpha-olefins polymers with an improved productivity, when it is carried out in the presence of the newly activated chromium-containing supported catalyst.

In accordance with the present invention, a chromium containing catalyst supported on a silica containing base is first heated in an oxidizing atmosphere and then cooled down successively under an oxidizing and non oxidizing atmosphere.

DESCRIPTION OF THE PREFERRED EMBODIMENTS

The silica-containing base can be any silica-containing material as broadly disclosed in U.S. Pat. No. 2,825,721 issued to J. P. Hogan and R. L. Banks, the disclosure of which is incorporated herein by reference.

Suitable silica-containing bases can be selected from catalytic grade silica, silica-alumina, silica-boria, silica-titania, silica-zirconia and mixtures thereof in which the silica constitutes at least 90 weight percent, and preferably more than 95 weight percent of the silica-containing material.

Preferably, the silica-containing material is in the form of a gel, more particularly in the form of a dried hydrogel or xerogel. Silica-containing gels can be prepared according to conventional methods (see e.g. U.S. Pat. No. 3,900,457 issued to Witt), for instance, by contacting an aqueous mineral acid solution with an aqueous solution of an alkali metal silicate to form a hydrogel, aging the hydrogel for a time of more than one hour and washing the thus aged hydrogel in order to recover a hydrogel substantially free of alkali metal. The thus washed hydrogel is then submitted to a step of removal of water. This can conventionally be done, for instance, by heating the hydrogel at elevated temperatures, up to about 400° C. and more, or by mixing the hydrogel with a normally liquid oxygen-containing water soluble organic compound and by removing the water from the hydrogel through repeated washings with the said organic compound or by azeotropic distillation.

Outstanding results have been obtained with silica-containing bases constituted by porous silica gels containing no more than about 0 5 weight per cent of alumina and featuring a specific surface area comprised between about 250 and 350 m$^2$/g (BET method) and a pore volume comprised between 1.30 and 1.90 ml/g. A typical example of such a silica-containing base is the 952 grade silica commercially available from the Davison Chemical Company.

The supported catalyst of the present invention contains chromium, in an amount generally comprised within the range of 0.001 to 10, preferably 0.1 to 5 and most preferably from about 0.5 to about 1.5 weight per cent based on the weight of the silica-containing base. The chromium compound can be incorporated in accordance with any method known in the art. For instance, an aqueous solution of a chromium compound such as chromium trioxide or chromium acetate can be added to the silica hydrogel before drying; a hydrocarbon solution of a material such as tertiary butyl chromate can be used to impregnate the xerogel; chromium can be coprecipitated along with the silica; dry mixing techniques are also feasible.

The chromium containing catalyst supported on the silica-containing base thus obtained is, in accordance with the invention, submitted to a multistep activation treatment.

The first step of the said activation treatment is an oxidizing activation carried out by the conventional method consisting of heating the supported catalyst in an oxidizing atmosphere at temperatures generally comprised between 500 and 1000° C.

By this first step, known per se, the chromium compound incorporated in the catalyst is converted into chromium oxide by calcination with at least a part of the chromium being converted to the hexavalent state.

The oxidizing atmosphere is preferably pure oxygen or air, more preferably substantially anhydrous air. The oxidizing activation is preferably carried out at temperature within the range of 600°–850° C., most preferably between about 800° and 850° C. The duration of the oxidizing activation must be enough to ensure that at least a portion of the chromium contained in the catalyst is in the hexavalent state, and is generally comprised between about 30 minutes and about 50 hours, more preferably between 1 and 20 hours.

The second step of the said activation treatment is a cooling step of the supported catalyst performed in an oxidizing atmosphere. Conveniently, the oxidizing atmosphere in which the said cooling step is performed is the same as the one present during the first step of oxidizing activation. During the said cooling step, the temperature of the supported catalyst is brought from the oxidizing activation step temperature to a temperature which, while being below the said oxidizing activation step temperature, is higher than 400° C., preferably between 550° and 750° C. Outstanding results have been obtained when, the oxidizing activation having been carried out at about 800° to 850° C., the supported catalyst is cooled in dry air until its temperature is comprised between about 600° and about 650° C. The duration of the cooling step is not critical and is conveniently comprised between 15 minutes and 10 hours.

During the next step of the activation treatment, the oxidizing atmosphere surrounding the supported catalyst is replaced, at the temperature prevailing at the end of the cooling step disclosed above, by a non-oxidizing atmosphere. This non-oxidizing atmosphere is preferably an inert atmosphere. Usable inert atmospheres include vacuum, helium, argon and nitrogen. The most preferred inert atmosphere is nitrogen, chiefly for reasons of commodity.

The supported catalyst is generally maintained under the said non-oxidizing atmosphere and at the temperature prevailing at the end of the cooling step, for a time sufficient to achieve at least partial self-reduction of at least a portion of the contained chromium to a lower valence state. It has in effect been observed that some kind of reduction of the said chromium takes place under these conditions, (the evolution of gaseous oxygen is observed) and this is the reason why this step is called a "self reduction step".

The supported catalyst is maintained under these conditions for a duration generally extending from 15 minutes to about 20 hours, preferably from 1 to 10 hours, and more preferably from 2 to 8 hours.

The last step of the activation treatment is a further cooling step, by which the temperature prevailing during the self reduction step is lowered, while the supported catalyst is maintained under the non-oxidizing atmosphere.

During this last step, the supported catalyst is progressively brought to ambient temperature. This can be done by self-cooling of the supported catalyst, or by fast cooling by external means. Very good results have been obtained by carrying out this last step by slow cooling down to a temperature comprised between about 400° and 300° C., preferably around 320° C., and by a further fast cooling to ambient temperature (about 25° C.). The whole duration of the second cooling step is generally comprised between 15 minutes and 10 hours.

The several stages of the multistep activation treatment of the chromium-containing catalyst supported on the silica-containing base of the present invention can be performed in accordance with any known method of gas-solids contacting, for instance with the catalyst in stationary or fluidized bed.

Most conveniently, the several stages of the multistep activation treatment are carried out under fluid bed conditions, the supported catalyst being maintained in the fluidized state by means of the gases usable respectively as oxidizing and non-oxidizing atmospheres.

If desired, the activation of the supported catalyst of the invention may be performed continuously, as disclosed for instance in U.S. Pat. No. 4,151,122 issued to Mc Daniel et al.

The activated chromium-containing supported catalysts of this invention can be used to polymerize alpha-monoolefins containing 2 to 8 carbon atoms per molecule, and particularly to produce ethylene homopolymers and copolymers from mixtures of ethylene and 1 or more comonomers selected from the above mentioned alpha-monoolefins and diolefins containing 3 to 8 carbon atoms per molecule. Specific examples of these comonomers are propylene, 1-butene, 1-hexene, 1-octene and conjugated or non-conjugated diolefins such as 1,3-butadiene, isoprene, and 1,4-pentadiene. Among copolymers, those containing at least about 90, preferably 95 to 99 per cent by weight of polymerized ethylene, the comonomer being propylene, 1-butene, 1-hexene or 1-octene, are especially preferred.

The polymers can be prepared from the activated supported catalysts of the invention by solution polymerization, slurry polymerization and gas-phase polymerization techniques, using conventional equipment and contacting processes. The activated catalysts of the invention are particularly suitable to be used in slurry polymerizations for the production of polymers featuring broad ranges of melt-indexes and of molecular weight distributions, both parameters being controllable by well known means like the polymerization conditions, the conditions of the oxidizing activation step, the morphology of the support, etc. The slurry process is carried out in on inert diluent such as a paraffinic or cycloparaffinic hydrocarbon at a temperature at which the resulting polymer is insoluble. Examples of suitable inert diluents are normal lower alkanes, like n-butane, n-hexane and 1-heptane, branched lower alkanes like isobutane isopentane, isooctane and 2,2 dimethylpropane, and cycloalkanes like cyclopentane and cyclohexane and mixtures thereof. For ethylene polymers and copolymers, the temperature can extend from about 70° to about 115° C.

The activated supported catalysts of this invention are able to render alpha-olefin polymers with a polymerization rate which, quite surprisingly, is much higher than the polymerization rate which characterizes the conventional chromium containing catalysts supported on silica containing base which have not been activated by the multistep activation treatment in accordance with the present invention.

EXAMPLE 1

A 1% by weight chromium-containing catalyst supported on a silicagel base (specific surface area: 300 m$^2$/g; porous volume: 1.60 ml/g) containing 97% by weight silica and 0.15% by weight alumina, sold by Davison Chemical Company under the trade denomination "969 MSB" is activated in a tubular oven containing a 200 ml fluidized bed type quartz reactor.

During the first step of the activation, the supported catalyst is fluidized in dry air at 815° C. during 16 hours.

During the second step of the activation the supported catalyst is cooled down from 815° C. to 650° C., while being maintained in fluidisation under dry air. The duration of this first cooling step is 0.5 hours.

During the third step of the activation, the dry air is replaced by dry nitrogen, the supported catalyst being still maintained under fluidisation at 650° C. for 5 hours.

During the fourth step of the activation, the supported catalyst is cooled down, while still maintained in fluidisation under dry nitrogen, from 650° C. to 350° C. The duration of this second cooling step is 2 hours.

The thus activated supported catalyst is at last rapidly cooled under nitrogen from 350° C. to room temperature in half an hour.

A polymerization test is carried out in the presence of 91 mg of the thus activated supported catalyst under the following conditions:

- 3 l stainless steel autoclave equipped with stirring means;
- diluent: 1000 ml of isobutane;
- temperature: 105° C.
- ethylene pressure: $15.10^5$ Pa;
- duration: 1 hour, after the induction period.

There are recovered 529 g of polyethylene (PE), the melt index (MI) and high load melt index (HLMI) of which (determined in accordance with ASTM D 1238-65T, condition E, the loads being respectively 2.16 and 21.6 kg) being respectively 0.36 and 24.5 g/10 min. The HLMI/MI ratio is thus 68.0. The catalytic productivity, expressed in g PE/g supported catalyst x hour, is 5813.

EXAMPLE 2

(COMPARISON)

The supported catalyst of example 1 is submitted to the first step of activation described in the said example. The said supported catalyst is cooled afterwards from 815° C. continuously until 350° C. in three hours and without substituting the fluidizing air by nitrogen. This conventionally activated supported catalyst is finally rapidly cooled under nitrogen from 350° C. to room temperature in half an hour, as in example 1.

A polymerization test is carried out in the presence of 100 mg of the thus conventionally activated supported catalyst, the polymerization conditions being exactly the same as set forth in example 1.

There are recovered 435 g of PE, the MI and HLMI of which being respectively 0.57 and 32 g/10 min, and the HLMI/MI ratio being thus 56.

The catalytic productivity, expressed as in example 1, is only 4350.

While this invention has been described in detail for the purpose of illustration, it is not to be construed as limited thereby but is intended to cover all changes and modifications within the spirit and scope thereof.

We claim:

1. A method for activating a chromium-containing catalyst supported on a silica-containing base which comprises the successive steps of:
   (a) heating the catalyst in an oxidizing atmosphere at an oxidizing activation temperature from 600° to 850° C. until at least a part of the chromium present in the catalyst is converted to the hexavalent state;
   (b) cooling the catalyst in an oxidizing atmosphere until it reaches a temperature below the oxidizing activation temperature and from 550° to 750° C. at the end of said cooling;
   (c) replacing the said oxidizing atmosphere by a non-oxidizing atmosphere at the temperature reached at the end of step (b) and maintaining the catalyst at the said temperature for a time from 15 minutes to 20 hours to achieve at least partial self-reduction of at least a portion of the chromium present in the catalyst to a lower valence state; and
   (d) cooling the catalyst in the said non-oxidizing atmosphere from the temperature of step (c) to ambient temperature.

2. A method according to claim 1 wherein the oxidizing atmosphere is anhydrous air.

3. A method according to claim 1 wherein the oxidizing activation temperature of step (a) is within the range of 800°-850° C. and the temperature reached at the end of cooling step (b) is within the range of 600°-650° C.

4. A method according to claim 1 wherein the non-oxidizing atmosphere is an inert atmosphere.

5. A method according to claim 4 wherein the inert atmosphere is nitrogen.

6. A method according to claim 4 wherein the inert atmosphere is argon.

7. A method according to claim 1 wherein the silica-containing base is in the form of a silica gel.

8. An activated chromium-containing catalyst produced by the method of claim 1.

* * * * *